3,538,046
POLYURETHANES STABILIZED WITH
PHENOLIC HYDRAZIDES
Harald Oertel, Odenthal-Globusch, Friedrich-Karl Rosendahl, Leverkusen, and Ulrich Eholzer, Cologne-Stammheim, Germany, assignors to Farbenfabriken Bayer Aktiengesellschaft, Leverkusen, Germany, a corporation of Germany
No Drawing. Filed Nov. 30, 1967, Ser. No. 686,819
Claims priority, application Germany, Dec. 2, 1966,
F 50,826
Int. Cl. C08g 51/60
U.S. Cl. 260—45.9                                                6 Claims

ABSTRACT OF THE DISCLOSURE

Polyurethanes stabilized with phenols having at least one tertiary alkyl group in the ortho position to the hydroxyl group and an N,N-dialkyl hydrazide or N,N-dialkyl semicarbazide group attached to the benzene ring via an aliphatic radical and a process for preparing same.

This invention relates to polyurethanes and, more particularly, to a process for stabilizing elastomeric polyurethanes of linear segmented or cross-linked structure or cellular polyurethane foams against degradation by light or heat or atmospheric conditions and the stabilized polyurethanes thereby obtained.

Polyurethanes are generally unstable to light and air, especially at elevated temperatures, whether they are in the form of a foam, a coating or an elastomer. Polyurethanes are sensitive to the degradative effects of light and heat to varying degrees depending to a certain extent upon the components from which the polyurethane is prepared. The result of such degradation is often a serious impairment of the mechanical properties of the polyurethane which is often accompanied by marked discoloration.

Many attempts have been made to impart at least some degree of stability to polyurethanes against such discoloration and degradation. It has been proposed that antioxidants known per se be added to polyurethanes such as, for example, those based on phenol and including:

2,6-ditertiary butyl phenyl,
2,6-ditertiary butyl-4-methyl-phenyl,
2,2'-methylene-bis-(6-tertiary-butyl-4-methyl-phenol),
1,3,5-trimethyl-2,4,6-tris-(3,5-ditertiary butyl-4-hydroxybenzyl)-benzene or
2,5-ditertiaryamylhydroquinone, if desired in combination with light protective agents such as UV absorbents including 2(2'-hydroxy-3'-tertiary butyl-5 - methylphenyl) - 5-chloro-benzotriazole or o-hydroxybenzophenone derivatives, but the stabilization achieved is generally insufficient.

In addition, special stabilizers have been proposed in order to solve this problem including hydrazides such as adipic acid dihydrazide or hexamethylene-bis-semicarbazide. Although these copounds have an excellent stabilizing effect, they cause serious polymer degradation when the polyurethanes are heated. Dialkyl hydrazides and dialkyl semicarbazides have also been proposed as effective active compounds, optionally in admixture with phenolic antioxidants.

It is therefore an object of this inention to provide a process for stabilizing polyurethanes against degradation caused by light, air and temperature which is devoid of the foregoing disadvantages.

A further object of this invention is to provide a unique stabilizer for elastomeric polyurethanes in general and polyurethane filaments in particular.

A still further object of this invention is to provide polyurethanes which are stable to the degradative effects of light, air and elevated temperatures.

The foregoing objects and others which will become apparent from the following description are accomplished in accordance with this invention, generally speaking, by providing as a stabilizer for elastomeric polyurethanes in general and polyurethane filaments in particular, a phenol having at least one tertiary alkyl group in the ortho position to the hydroxyl group and one N,N-dialkyl-hydrazide or N,N-dialkyl-semicarbazide group linked to the benzene nucleus through an aliphatic radical. The phenols are added to the polyurethanes or the components thereof in quantities of 0.05 to 10% by weight based on the weight of the polyurethane or its starting materials.

The phenols of this invention are excellent stabilizers for polyurethanes. The stabilizing effect achieved is better than that of the individual groups such as, for example, the sterically hindered phenols, and better than that of a mixture of dialkyl hydrazides and sterically hindered phenols. In addition, the phenol dialkyl hydrazides or phenol dialkyl semicarbazides of this invention, which will be referred to hereinafter collectively as phenol dialkyl hydrazide compounds, are soluble in polyurethane reactants such as, for example, higher molecular weight polyesters or polyethers. Further, they are compatible with the polyurethane product and do not form crystalline deposits on the surface of the polyurethane article in which they are incorporated. The solubility of the phenol dialkyl hydrazide compounds of this invention in water, on the other hand, is very slight, which makes them particularly advantageous for stabilizing coatings or filaments that are exposed to weathering or washing processes.

The stabilizers of this invention may be represented by the formula:

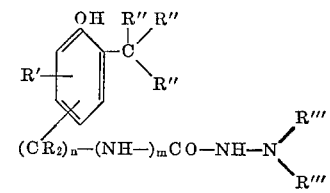

wherein R represents the same or different radicals such as hydrogen or alkyl, R' represents hydrogen, alkyl, alkoxy, or halogen, R" represents alkyl, R''' represents an alkyl, w-hydroxyalkyl, w-halogen alkyl radical or two alkyl radicals R''' may be constituents of a 5 or 6-membered ring system which may in addition contain oxygen or nitrogen as a hetero atom, $n$ is an integer of from 1 to 12 and $m$ is 0 or 1.

In the foregoing formula, R represents hydrogen or an alkyl radical which may be a straight chained or branched alkyl group having from about 1 to about 12 carbon atoms or a cycloalkyl group which preferably contains 5 or 6 carbon atoms in the ring system such as, for example, methyl, ethyl, isopropyl, hexyl, octyl dodecyl, cyclopentyl, cyclohexyl groups and the like; R' represents hydrogen, an alkyl radical which may be a straight chained or branched alkyl or cycloalkyl group having up to about 12 carbon atoms such as, for example, methyl, ethyl, propyl, isopropyl, butyl, cyclopentyl, cyclohexyl, cyclooctyl, decyl, dodecyl and preferably tertiary alkyl groups such as, for example, tertiary butyl, tertiary amyl, tertiary octyl and the like, R' may also represent an alkoxy group and preferably one which contains from about 1 to about 6 carbon atoms such as, for example, methoxy, ethoxy, propoxy, hexoxy and the like, or halogen and preferably chlorine, bromine or iodine; R" represents an alkyl radical having from about 1 to about 18 carbon atoms or a cycloaliphatic radical, preferably having 5 or 6 carbon atoms in the ring system such as, for example, methyl, ethyl, propyl, isopropyl, octyl, decyl, octadecyl, isobutyl, isohexyl, cyclopentyl, cyclohexyl and the like. The group

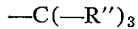

preferably represents a tertiary butyl, tertiary amyl or tertiary octyl radical; R''' represents an alkyl group having from about 1 to about 12 carbon atoms but preferably 1 to 4 carbon atoms such as, for example, methyl, ethyl, propyl, butyl, hexyl, octyl, decyl, dodecyl and the like, a cycloalkyl group having preferably 5 to 12 carbon atoms in the ring system such as, for example, cyclopentyl, cyclohexyl, cycloheptyl, cyclodecyl, cyclododecyl and the like, w-hydroxyalkyl groups wherein the alkyl is preferably a lower alkyl group containing from about 1 to about 6 carbon atoms such as, for example, w-hydroxyethyl, w-hydroxymethyl, w-hydroxypropyl, w-hydroxyhexyl, w-hydroxy-w-methylethyl, w-chloroethyl and the like; two alkyl groups R''' may, if desired, together form a 5 or 6-membered ring which may also contain hetero atoms, such as an oxygen or nitrogen atom. Further, although $n$ in the formula represents an integer of from 1 to 12, the group —(CRR)—$_n$ should not have more than 25 carbon atoms and generally not more than 12 carbon atoms and preferably only 1 to 3 carbon atoms. In addition, $m$ in the formula represents 0 to 1.

The phenol radical of the formula is preferably an o,o'-di-tertiary-alkyl-phenol radical such as, for example, an o,o'-di-tertiary-butyl-phenol radical or an o-tertiary-alkyl-phenol radical in which R' is an alkyl group.

The phenol-dialkyl hydrazide stabilizers of this invention can be synthesized as described in the examples.

For example, the stabilizers of this invention having a formula in which $m=1$ can be obtained by reacting phenol alkylamines such as 2-tertiary butyl-4-w-aminoethyl-phenol, for example, with dialkylhydrazine carboxylic acid esters such as N,N-dimethylhydrazine carboxylic acid phenyl ester, for example, or by any other suitable process. In like manner, those stabilizers of this invention having a formula wherein $m=0$ may be prepared by reacting corresponding phenol carboxylic acid chlorides with N,N-dialkylhydrazines, for example, to yield phenol-dialkyl carboxylic acid hydrazide compounds, or by any other suitable process.

Examples of suitable N,N-dialkylhydrazines from which the stabilizers of this invention may be prepared, apart from the preferred N,N-dimethylhydrazine, are N,N-diethyl- and N,N-dibutylhydrazine and N,N-dialkylhydrazines which have alkyl groups forming a ring, if desired with hereto atoms, or alkyl groups which contain functional groups such as e. g. N-amino-pyrrolidine, N-amino-piperidine, N-amino-morpholine, N-amino-tetrahydrothiazine-S-dioxide, N,N-bis-hydroxyethyl-hydrazine, N,N-bis-(b-hydroxypropyl)-hydrazine and the like. Bis-dialkylhydrazines such as N,N-diamino-piperazine are also suitable starting compounds.

Some specific examples of suitable phenyldialkylhydrazide compounds which may be used as stabilizers in accordance with this invention include:

1,1-dimethyl-4-(4'-hydroxy-3',5'-ditertiary butyl-benzyl)-semicarbazide,
1,1-dimethyl-4-(4'-hydroxy-3',5'-ditertiary butyl-phenethyl)-semicarbazide,
1,1-dimethyl-4-(4'-hydroxy-3',5'-ditertiary butyl-phenylpropyl)-semicarbazide,
1,1-diethyl-4-(4'-hydroxy-3',5'-ditertiary butyl-phenylpropyl)-semicarbazide,
1,1-diisopropyl-4-(4'-hydroxy-3',5'-ditertiary amyl-phenylpropyl)-semicarbazide,
1,1-dihydroxyethyl-4-(4'-hydroxy-3',5'-ditertiary-butyl-phenylpropyl)-semicarbazide,
1,1-di-(b-hydroxypropyl)-4-(4'-hydroxy-3',5'-ditertiary-butyl-phenylpropyl)-semicarbazide,
1,1-dimethyl-4,(4'-hydroxy-3',5'-ditertiaryoctyl-phenylpropyl)-semicarbazide,
1,1-dimethyl-4-(2'-hydroxy-3'-tertiary butyl-5'-methyl-benzyl)-semicarbazide,
1,1-diethyl-4-(2'-hydroxy-3'-tertiary-dodecyl-5'-methyl-benzyl)-semicarbazide,
1,1-diethyl-4-(2'-hydroxy-3',5-ditertiary butyl-benzyl)-semicarbazide,
1,1-dimethyl-4-(2'-hydroxy-3'-tertiary butyl-5'-methyl-phenylpropyl)-semicarbazide,
1,1-dimethyl-4-(2'-hydroxy-3'-tertiary amyl-5'-methyl-phenylpropyl)-semicarbazide,
3,5-ditertiary butyl-4-hydroxy-phenylacetic acid N,N-dimethyl-hydrazide,
3,5-ditertiary butyl-4-hydroxy-phenylacetic acid N-amino-morpholide,
3,5-ditertiary butyl-4-hydroxyphenyl-propionic acid N,N-dimethyl hydrazide,
bis-(3,5-ditertiary butyl-4-hydroxyphenyl-propionic acid)-N,N'-diaminopiperazide,
3,5-ditertiary octyl-4-hydroxyphenyl-butyric acid-N,N-dimethyl hydrazide,
3-tertiary butyl-4-hydroxy-5-methyl-phenyl-propionic acid-N,N-dimethylhydrazide,
2-hydroxy-3-tertiary butyl-5-methyl-phenylpropionic acid N,N-dimethyl-dihydrazide,
3,5-ditertiary octyl-4-phenyl-propionic acid-N,N-dimethyl hydrazide,
1,1-dimethyl-4-(3'-isopropyl-5'-tertiary butyl-4'-hydroxy-phenyl-g-propyl)-semicarbazide,
1,1-dimethyl-4-(3'-methyl-5'-tertiary butyl-4'-phenylethyl)-semicarbazide,
1,1-dimethyl-4-(3'-chloro-4'-hydroxy-5'-tertiary butyl-phenethyl)-semicarbazide,
1,1-dimethyl-4-(2'-bromo-4'-hydroxy-5'-tertiary butyl-benzyl)-semicarbazide,
1,1-dimethyl-4-(2'-hydroxy-3'-tertiary butyl-5'-methoxy-phenylethyl)-semicarbazide
and the like and mixtures thereof.

The polyurethane resins to be stabilized in accordance with this invention can be prepared by methods known per se and from known starting materials. The polyurethane resins are generally prepared by reacting higher molecular weight polyhydroxy compounds such as, for example, polyesters or polyethers having a molecular weight of from about 500 to about 5000 and melting points preferably below about 60° C., with aliphatic, araliphatic or aromatic polyisocyanates and preferably aromatic diisocyanates such as tolylene diisocyanate or diphenylmethane-4,4'-diisocyanate and so-called chain lengthening agents such as, for example, low molecular weight compounds having two or more groups that are reactive with isocyanate groups including, for example, low molecular weight diols, diamines, dihydrazides or similar compounds, such as amino alcohols, amino hydrazides and hydroxy hydrazides, preferably having a molecular weight of from about 18 to about 400, or water by a single stage or multistage process, in a melt or in solvents, by numerous known processes or modifications thereof.

Some specific examples of polyhydroxy compounds which may be used in the preparation of the polyurethane include polyesters of adipic acid and dialcohols having from about 2 to about 10 carbon atoms, and preferably those having more than 5 carbon atoms; dialcohols may also be used in the mixture to lower the melting point of the polyesters; polyesters of caprolactone and dialcohols; polyalkylene ether diols, especially polytetramethylene ether diols, polytrimethylene ether diols, polypropylene glycol or corresponding copolyethes, as well as any of those active hydrogen containing compounds listed in U.S. Pat. 3,201,372. Any suitable polyisocyanate such as, for example, those listed in Canadian Pat. 698,636 may be used to prepare the polyurethane although aromatic diisocyanates such as, for example, diphenylmethane-4,4'-diisocyanate, tolylene diisocyanate, araliphatic diisocyanates such as m-xylylene diisocyanate or aliphatic diisocyanates such as hexamethylene diisocyanate and dicyclohexylmethane-4,4'-diisocyanate are preferred.

As chain lengthening agents in the preparation of the polyurethane one may use dihydric or trihydric alcohols such as, for example, butanediol or trimethylolpropane and diamines such as diphenylmethane-4,4'-diamine or 3,3'-dichloro-diphenylmethane-4,4'-diamine as well as those chain lengtheners mentioned in U.S. Pat. 3,201,372. Preferably, however, aliphatic diamines such as ethylene diamine, isophorone diamine or m-xylylene diamine as well as hydrazine or dihydrazides such as carbodihydrazide, oxalic acid dihydrazide or malonic acid dihydrazide are used.

Although the stabilizers of this invention may be used to stabilize any elastomeric linear or cross-linked polyurethane which can also be in the form of an elastic, cellular foam, they are particularly advantageous for the stabilization of polyurethanes which contain, in addition to urethane groups, —NH—CO—NH— groups formed by the reaction between isocyanate groups and water or compounds having $NH_2$ end groups such as, for example diamines, dihydrazides, carbodihydrazide or hydrazine. These polyurethanes should preferably have a substantially linear, segmented molecular structure and be soluble in highly polar solvents such as dimethylformamide, dimethylacetamide and the like. The characteristic segments of such polymers can be represented by the grouping:

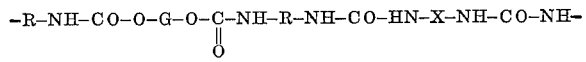

wherein R denotes a divalent aliphatic, araliphatic or aromatic radical derived from a diisocyanate, G denotes the residue remaining after the removal of the terminal hydroxyl groups from a polyhydroxy compound having a molecular weight of from about 500 to about 5000 and a melting point below about 60° C. such as, for example, a polyalkylene ether, polyester, polyacetal or poly-N-alkylurethane, and X denotes the residue remaining after the removal of the terminal amino groups from a divalent chain lengthening agent having terminal $NH_2$ groups such as, for example, an aliphatic, araliphatic, aromatic or heterocyclic radical, an HN-CO-alkylene-CO-NH radical, an HN-CO-arylene-CO-NH radical, an NH-CO-NH radical, an NH-CO-CO-NH radical or a >N-H< linkage.

Cellular polyurethane foams may be prepared by each of the processes as described in Ullmann "Enzyklopädie der technischen Chemie," 3rd edition, vol. 14, pages 355 to 358; crosslinked elastomers may be prepared by each of the methods given in Ullmann, ib., pages 346 to 350.

The stabilizers of this invention can be incorporated into polyurethanes by any desired method adapted to the requirements of the process. The simplest method consists in adding the stabilizers, if desired in solution, to solutions of the polyurethanes, for example, solutions in dimethylformamide, which is the preferred form of solution for spinning, coating and coagulating purposes. On the other hand, the stabilizers may be incorporated into the melts or plasticized polyurethane sheets by means of any suitable mixing apparatus such as kneaders or rollers. In the case of elastomer filaments, the stabilizers may be applied to the surface together with the dressing or may be applied by immersing a fabric containing a polyurethane elastomer fiber in solutions of the stabilizer. Cellular polyurethane foams may be soaked in solutions of the stabilizer (et.g. petrolether, methanol) so that the foamed articles have a content of stabilizer between 0.05 and 10%.

Another possibility consists in adding the stabilizers to the polyurethane reactants and only then carrying out the polyurethane synthesis.

The phenol-dialkylhydrazide compounds are soluble in the higher molecular weight polyhydroxyl compounds such as polyesters or polyethers. Therefore, polyurethane syntheses, for example, for the production of foam plastics, can be carried out using such polyesters or polyethers in which the stabilizers of this invention have been dissolved. The stabilizers may also be added to the NCO-prepolymers formed from higher molecular weight polyhydroxyl compounds and an excess of diisocyanate before the formation of the polyurethane, for example, by spinning them into aqueous diamine solutions. The quantity of stabilizers added amounts to from about 0.05 to about 10% and preferably from about 0.2 to about 3.0% by weight.

The stabilizers of this invention may also be used in conjunction with other phenolic stabilizers or, if desired, mixtures thereof may be employed such as, for example, 2,4,6 - tris - (3',5' - ditertiary butyl - 4 - hydroxybenzyl)-mesitylene, 3,5 - ditertiary butyl - 4-hydroxy-phenyl-propionic acid tri- (or tetra-) pentaerythritol ester, 2,5-ditertiaryamylhydroquinone, 4,4' - isobutylidene - bis(2-tertiary butyl-5-methylphenol), 2-(2'-hydroxy-3'-tertiary butyl-5'-methylphenyl)-5-chloro-benzotriazole, 2,4,2'-trihydroxy-5-tertiary butyl-benzophenone and the like; alkyl or arylphosphites or phosphines such as, for example, triphenylphosphite, triphenylphosphine and the like; dialkyl-semicarbazides or -hydrazides and the like.

The use of mixtures of the above types of stabilizers with the stabilizers of this invention sometimes produces synergistic effects which can be enhanced in some cases by the addition of compounds which contain tertiary nitrogen atoms such as, for example, poly-(N,N-diethylamino-ethyl-methacrylate).

The stabilized polyurethanes of this invention are eminently suitable for use in any application in which polyurethanes may be employed. For example, they may be used in the preparation of films, fibers, coatings and lacquers, foam and foam padding and cushioning and the like.

The invention is further illustrated but is not intended to be limited by the following examples in which all parts and percentages are by weight unless otherwise specified.

EXAMPLE 1

(a) Preparation of a polyurethane solution

About 1000 parts of a polytetramethylene ether diol (molecular weight 1022) are heated to about 80° C. with about 369 parts of diphenylmethane-4,4'-diisocyanate and about 341 parts of chlorobenzene for about 68 minutes. The resulting NCO polymer solution is rapidly cooled to room temperature.

About 389 parts of the above NCO polymer solution are stirred slowly at room temperature into a suspension prepared by throwing about 10 parts of carbon dioxide snow into a solution of about 8 parts of ethylene diamine in about 902 parts of dimethylformamide. A highly viscous elastomer solution of about 620 poises/20° C. is formed which is pigmented with about 11 parts of rutile (c.=24.6%).

(b) Preparation of the stabilized polyurethanes

About 3 parts of N'-(3,5-ditertiary-butyl-4-hydroxyphenyl-g-propyl)-N,N-dimethylsemicarbazide dissolved in about 20 parts of dimethylacetamide are stirred into about 500 parts of the above elastomer solution (addition of about 2% by weight based on elastomer content). Into other portions of the original elastomer solution, about 2% of each of the following are added for comparison: 2,6 - ditertiary-butylphenol, ω,ω'-tetramethyl-hexamethylene-bis-semicarbazide and 1% by weight of 2,6-ditertiary-butyl phenol plus 1% by weight of tetramethyl hexamethylene-bis-semicarbazide (comparison tests).

The solution containing the stabilizer and the solutions used for comparison purposes are applied to glass plates (thicknesses of layers about 1.0 mm.) and dried in a drying cupboard to form films of about 0.20 mm. in thickness. The phenol semicarbazide stabilizer is readily soluble in the polyurethane and does not form crystalline deposits on the surface of the film as does tetramethyl hexamethylene-bis-semicarbazide according to German Pat. 1,184,947. The films are cut up into filaments of about 700 den. in thickness with a foil cutting machine and all the filaments (blanks and filaments with additives) are exposed simultaneously to UV light in an Atlas Fade-o-meter. The results are summarized in Table 1.

(c) Preparation of stabilizer

About 370 parts of 3,5-ditertiary butyl-4-hydroxyphenyl-propionitrile are hydrogenated in about 1300 parts of methanol with the addition of about 170 parts of liquid ammonia and about 70 parts of Raney cobalt while hydrogen is forced in for about 2 hours at about 80° C. After filtration and removal of the solvent by distillation, about 371 parts of an amine having a melting point of about 120° C. to about 123° C. are obtained which, after recrystallization from a mixture of cleaning petrol and active charcoal, yields about 312 parts of pure 3,5-ditertiary butyl-4-hydroxyphenyl-γ-propylamine; M.P. 123° C.

About 105 parts of 3,5-ditertiary butyl-4-hydroxyphenyl-propylamine are heated at about 145° C. for about 6 hours with about 72 parts of N,N-dimethyl-hydrazine carboxylic acid phenyl ester. The phenols which separate out largely distill off during the last three hours in vacuo (40 to 50 mm. Hg). The residue (about 149 parts) is taken up and stirred with water, and the crystals are recrystallized from cleaning petrol with the addition of active charcoal. About 116 parts of colorless crystals of N'-(3,5 - ditertiary butyl - 4 - hydroxy - phenylpropyl) - N, N - dimethyl-semicarbazide having a melting point of about 160° C. to about 161° C. are obtained.

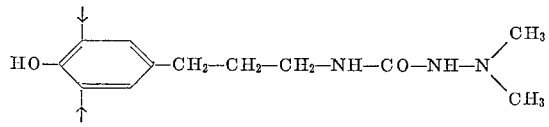

EXAMPLE 2

(a) Preparation of a polyurethane solution

As in Example 1, about 397 parts of the NCO-polymer solution from Example 1 are stirred into a suspension prepared from a solution of about 6 parts of hydrazine hydrate in about 903 parts of dimethylformamide by throwing in about 10 parts of carbon dioxide snow. The viscosity of the resulting elastomer solution (192 poises) is increased to 520 poises by the addition of about 0.50 part of hexane-1,6-diisocyanate. The elastomer solution is pigmented by stirring in about 11 parts of rutile.

(b) Preparation of the stabilized polyurethanes

To separate portions of this elastomer solution are added about 2% of N'-(3,5-ditertiary butyl-4-hydroxyphenyl-g-propyl)-N,N-dimethyl-semicarbazide and, respectively, the substances used for comparison as in Example 1. Films are prepared from the resulting solutions and filaments are cut from these films and exposed to light in the Fade-o-meter. The results are summarized in Table I.

EXAMPLE 3

(a) Preparation of a polyurethane solution

About 395 parts of the NCO/prepolymer solution described in Example 1 are introduced into about a 70° C. hot solution of about 11 parts of carbohydrazide in about 912 parts of dimethylformamide with the addition of about 11 parts of rutile. About 0.17 parts of hexanediisocyanate is added to the resulting mixture and a pigmented elastomer solution of about 550 poises is obtained.

(b) Preparation of the stabilized polyurethanes

To respective portions of this solution are added about 2% by weight of N'-(3,5-ditertiary-butyl-4-hydroxyphenyl-g-propyl)-N,N-dimethylsemicarbazide and the comparison substances as in Example 1. Filaments are obtained as in Example 1 which are exposed to light and then tested for mechanical strength and discoloration. The results are summarized in Table I.

TABLE I

| Example Number | Fade-o-meter exposure in hours | 2% 3,5-ditertiary butyl-4-hydroxy-phenyl-propyl-N,N-dimethyl-semicarbazide as stabilizer [a] | | | | Without stabilizer (comparison test) | | | |
|---|---|---|---|---|---|---|---|---|---|
| | | TS g./den. | Elongation, percent | TS (break) g./den. | Discoloration | TS g./den. | Elongation, percent | TS (break) g./den. | Discoloration |
| Filaments according to Example 1 | Original | 0.72 | 740 | 6.05 | Colorless | 0.56 | 800 | 5.2 | Colorless. |
| | 22 | 0.60 | 717 | 4.90 | do | <0.03 | 200 | | Yellow. |
| | 44 | 0.44 | 632 | 3.24 | do | Destroyed | | | Do. |
| | 66 | 0.05 | 220 | 0.15 | Almost colorless | Destroyed | | | Do. |
| Filaments according to Example 2 | Original | 0.67 | 745 | 5.62 | Colorless | 0.62 | 820 | 5.72 | Colorless. |
| | 22 | 0.69 | 670 | 5.31 | do | 0.41 | 535 | 2.58 | Yellowish. |
| | 44 | 0.61 | 680 | 4.75 | Almost colorless | 0.15 | 385 | 0.75 | Yellow. |
| | 66 | 0.43 | 592 | 2.97 | Yellowish | 0.10 | 295 | 0.39 | Do. |
| Filaments according to Example 3 | Original | 0.68 | 660 | 5.16 | Colorless | 0.66 | 840 | 6.21 | Colorless. |
| | 22 | 0.67 | 665 | 5.14 | do | 0.34 | 637 | 2.48 | Slightly yellow. |
| | 44 | 0.64 | 643 | 4.75 | do | 0.25 | 430 | 1.32 | Yellow. |
| | 66 | 0.58 | 610 | 4.15 | Almost colorless | 0.08 | 215 | 0.24 | Do. |

TABLE I—Continued

| Example Number | Fade-o-meter exposure in hours | 2% 2,6-ditertiary butyl-phenol as stabilizer (comparison test) [b] | | | 2% ω,ω'-tetramethylhexa-methylene-bis-semi-carbazide as stabilizer (comparison test) [c] | | | 1% tetramethyl-hexa-methylene-bis-semi-carbazide plus 1% 2,6-ditertiary-butylphenol as stabilizer (comparison test) | | |
|---|---|---|---|---|---|---|---|---|---|---|
| | | TS g./den. | Elongation, percent | TS (break) g./den. | TS g./den. | Elongation, percent | TS (break) g./den. | TS g./den. | Elongation, percent | TS (break) g./den. |
| Filaments according to Example 1 | Original | | | | | | | | | |
| | 22 | 0.03 | 26 | 0.03 | 0.37 | 750 | 3.14 | 0.37 | 758 | 3.15 |
| | 44 | (1) | | | 0.28 | 690 | 2.24 | 0.12 | 310 | 0.49 |
| | 66 | (1) | | | 0.05 | 90 | 0.09 | <0.05 | 112 | |
| Filaments according to Example 2 | Original | | | | | | | | | |
| | 22 | 0.13 | 388 | 0.62 | 0.31 | 685 | 2.49 | 0.34 | 700 | 2.73 |
| | 44 | 0.05 | 156 | 0.12 | 0.24 | 605 | 1.69 | 0.26 | 632 | 1.91 |
| | 66 | (1) | | | 0.24 | 600 | 1.69 | 0.14 | 406 | 0.70 |
| Filaments according to Example 3 | Original | | | | | | | | | |
| | 22 | 0.44 | 707 | 3.52 | 0.53 | 750 | 4.51 | 0.52 | 750 | 4.49 |
| | 44 | | | | | | | | | |
| | 66 | | | | 0.45 | 715 | 3.66 | 0.46 | 745 | 3.95 |

[1] Destroyed.

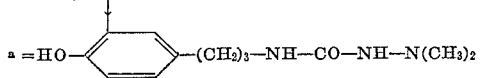

a = HO—⌬—(CH₂)₃—NH—CO—NH—N(CH₃)₂

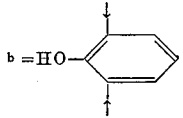

b = HO—⌬

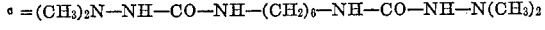

c = (CH₃)₂N—NH—CO—NH—(CH₂)₆—NH—CO—NH—N(CH₃)₂

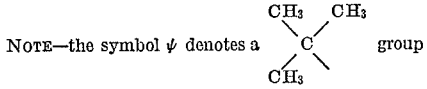

Note—the symbol ψ denotes a $\begin{smallmatrix} CH_3 \\ C \\ CH_3 \end{smallmatrix} CH_3$ group

EXAMPLE 4

(a) Preparation of a polyurethane solution

About 800 parts of a mixed polyester of adipic acid, hexane-1,6-diol and 2,2-dimethyl-propane-1,3-diol (mixture of glycols in the molar ratio of 65/35) having a molecular weight of about 1910 are heated to about 96° C. with about 16 parts of bis-(b-hydroxypropyl)-N-methylamine, about 236 parts of diphenylmethane-4,4'-diisocyanate and about 266 parts of chlorobenzene for about 65 minutes. After cooling to room temperature, the NCO content of the NCO-prepolymer solution is 2.69%.

About 9 parts of rutile and about 430 parts of the above NCO polymer solution are introduced into an approximately 60° C. hot solution of about 12 parts of carbodihydrazide in about 918 parts of dimethylformamide, and the moderately viscous elastomer solution (113 poises) is then treated with about 0.8 part of hexane-1,6-diisocyanate. The viscosity of the solution increases to about 540 poises/20° C.

(b) Preparation of the stabilized polyurethanes

To separate portions of this solution are added, respectively, 2% based on the solid substance of elastomer, of (a) 1,1-dimethyl-4(4'-hydroxy-3,5'-ditertiary butyl-benzyl)-semicarbazide (M.P. 166–168° C.), (b) 1,1-dimethyl - 4(2'-hydroxy-3'-tertiary butyl-5'-methyl-benzyl) - semicarbazide and no additive. Films of about 0.15 mm. in thickness are prepared from the stabilizer-containing solution (a) and (b) and the solution without additive, and these films are exposed in the Fade-o-meter. The results are summarized in Table II.

EXAMPLE 5

(a) Preparation of a polyurethane solution

About 449 parts of the NCO-prepolymer solution described in Example 4 are stirred into a suspension prepared by throwing about 20 parts of carbon dioxide snow into a solution of about 8 parts of ethylene diamine and about 1 part of 1,2-propylene diamine in about 918 parts of dimethylacetamide, and the resulting mixture is pigmented with about 11 parts of rutile.

(b) Preparation of the stabilized polyurethanes

To portions of this elastomer solution (555 poises) are added in each case about 2% by weight of (a) 1,1-dimethyl - 4(4'-hydroxy-3,5'-ditertiary butyl-benzyl)-semicarbazide, (b) 1,1 - dimethyl - 4-(2'-hydroxy-3'-tertiary butyl-5'-methyl-benzyl)-semicarbazide, and (c) 4 - hydroxy-3,5-ditertiary butyl-phenyl-propionic acid N,N-dimethylhydrazide, respectively. Films of about 0.15 mm. in thickness are prepared from the stabilizer-containing solutions (a), (b) and (c) and also from a solution without added stabilizer. The films are exposed in the Fade-o-meter and the results are summarized in Table II.

Yellowing and degradation by light are greatly reduced by the addition of the stabilizers. The resistance to dry heat (e.g. 150° C.) in the presence of light (oxygen) is also considerably improved. On exposure to UV light, the films without stabilizer undergo yellowing and become insoluble in dimethylformamide; when stretched, such films undergo brittle rupture of the surface. The stabilizer-containing films, on the other hand, remain soluble in dimethylformamide at room temperature, even after exposure to light, and show no sign of brittleness on their surfaces.

(c) Preparation of stabilizer

About 450 parts of 3,5-ditertiary butyl-4-hydroxyphenyl-propionic acid methyl ester are heated under reflux for about 6 hours in about 2000 parts of methanol and about 100 parts of about a 40% sodium hydroxide solution. When cold, the solutin ois poured into about 400 parts of ice water and acidified to a pH of 1 with hydrochloric acid. The precipitated crystals are filtered off, washed with water and dried at about 70° C./12 mm. Hg. The yield of 3,5 - ditertiary butyl-4-hydroxyphenyl-propionic acid amounts to about 421 parts; melting point about 168° C.

About 138 parts of 3,5-ditertiary butyl-4-hydroxyphenyl-propionic acid are dissolved in about 400 parts of benzene, and in the course of about 2 hours about 90 parts of thionyl chloride are added at from about 30° to about 40° C. In the course of a further 2 hours, the solution is heated to reflux and it is then kept heated under reflux for 2 hours. After removal of volatile constituents by evaporation, about 146 parts of 3,5-ditertiary butyl-4-hydroxyphenyl-propionic acid chloride (M.P. 70° to 73° C.) are obtained.

About 26 parts of 3,5-ditertiary butyl-4-hydroxyphenyl-propionyl chloride are heated under reflux with about 7 parts of N,N-dimethylhydrazine and about 12 parts of triethylamine in about 100 parts of benzene for about 150 minutes. The reaction solution is freed while still hot from precipitated triethylamine hydrochloride by filtration. About 25 parts of dimethyl hydrazide having a melting point of about 136 to about 140° C. crystallizes from the concentrated filtrate. After recrystallization from alcohol/water, 3,5-ditertiary butyl-4-hydroxyphenyl-propionic acid N,N-dimethylhydrazide is obtained in the form of colorless crystals having a melting point of about 140° C.

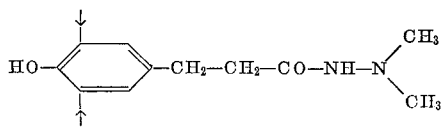

test). Another part of the elastomer solution is treated with about 2% by weight (based on elastomer solids content of the solution) of 1,1-dimethyl-4-(4'-hydroxy-3',5'-ditertiary butyl-phenylpropyl)-semicarbazide and spun in the same manner into elastomer filaments.

On exposure in the Fade-o-meter, the filament used for comparison is discolored and yellow after about 22 hours and yellow brown after about 44 hours, whereas the stabilizer-containing elastomer filament is still colorless after 66 hours and practically unchanged in its elastic properties. The stabilizer-containing filaments also show markedly increased resistance to discoloration on prolonged heating at temperatures above about 100° C.

If a mixture of about 1% by weight of 1,1-dimethyl-4-(4'-hydroxy - 3',5' - ditertiary butyl-phenylpropyl)-semicarbazide and about 0.5% by weight of 2-(2'-hydroxy-3'-tertiary butyl-5'-methyl-phenyl)-benzotriazole is used as the stabilizer, excellent stabilization of the polyurethane elastomers is again observed.

EXAMPLE 7

(a) Preparation of a polyurethane solution

About 436 parts of the NCO prepolymer solution of Example 6 are stirred into about a 95° C. hot solution of about 14 parts of oxalic acid dihydrazide in about 922 parts of dimethylformamide and pigmented with about 14 parts of rutile. The elastomer solution is rapidly cooled to room temperature.

| Stabilizer additive, percent by weight | Discoloration of films after exposure in Fade-o-meter | | |
|---|---|---|---|
| | 20 hours | 35 hours | 50 hours |
| Example 4.. 2ª | Colorless | Almost colorless | Yellowish. |
| 2ᵇ | Almost colorless | do | Do. |
| Without additive | Yellowish | Yellow | Intense yellow. |
| Example 5.. 2ª | Colorless | Almost colorless | Yellowish. |
| 2ᵇ | do | do | Do. |
| 2ᶜ | Almost colorless | do | Do. |
| Without additive | Yellow | Yellow brown | Yellow brown. |

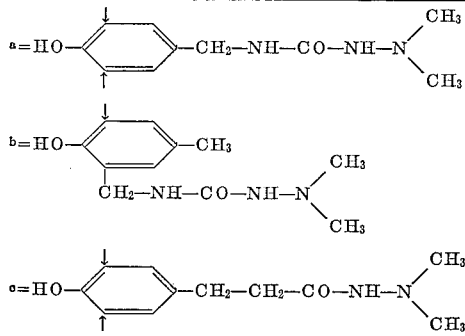

EXAMPLE 6

(a) Preparation of a polyurethane solution

About 1200 parts of a mixed polyester of adipic acid, hexane-1,6-diol and 2,2-dimethylpropane-1,3-diol having an OH number of about 63.8 are dehydrated in vacuo at about 130° C. for about one hour, mixed with about 24 parts of bis-(2-hydroxypropyl)-methylamine and a solution of about 350 parts of diphenylmethane-4,4'-diisocyanate and about 392 parts of chlorobenzene at about 60° C. After about 40 minutes' reaction at about 96° C. internal temperature, the NCO prepolymer solution obtained is cooled.

About 436 parts of this NCO-prepolymer solution are stirred within about 250 seconds into an approximately 65° C. hot solution of about 16 parts of malonic acid dihydrazide in about 935 parts of dimethylformamide and pigmented by the addition of about 14 parts of rutile.

(b) Preparation of the stabilized polyurethanes

Part of the highly viscous solution (772 poises) of part (a) is spun by the dry spinning process into an elastomer filament having a thickness of about 240 den. (comparison (b) Preparation of the stabilized polyurethanes About 1 part of the solution (854 poises) is left without stabilizer and another part is treated with about 2% by weight (based on elastomer solids content) of 1,1-dimethyl-4-(4' - hydroxy - 3',5' - ditertiary butyl-phenyl-propyl)-semicarbazide, and the solutions are in each case converted into filaments by spinning into hot water (wet spinning process) or into foils by pouring them onto glass plates and removing the solvent by evaporation. On exposure in the Fade-o-meter, the elastomers without stabilizer additive show intense yellow discoloration after only about 22 hours whereas the filaments with stabilizer additive are still colorless after about 50 hours exposure in the Fade-o-meter, and yellow discoloration can only be detected after about 70 hours.

It is to be understood that any of the components and conditions mentioned as suitable herein can be substituted for its counterpart in the foregoing examples and that although the invention has been described in considerable detail in the foregoing, such detail is solely for the purpose of illustration. Variations can be made in the invention by those skilled in the art without departing from the

EXAMPLE 8

To portions of the elastomer solution of Example 4 are added (in percent by weight, based on the solid substance of elastomer) stabilizing substances of the general formula

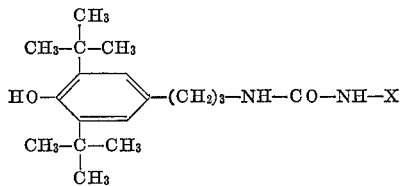

the percent by weight added, the meaning of the symbol —X and the melting point of the stabilizing substances are given in Table 3. The stabilizers are prepared by reaction of g-(3,5 - ditert.-butyl-4-hydroxyphenyl)-propyl-isocyanate with equivalent amounts of the corresponding N,N-dialkyl-hydrazine in inert solvents at room temperature.

Films which were prepared from the elastomer solution in known manner, showed no discolouration after 25 hours exposure in an Atlas Fade-o-meter and were not brittle in the surface.

After 90 minutes of exposure to the combustion-gas (90° C.) of a Bunsen-burner the discolouration of the films containing the stabilizing compounds was much less than the discolouration of the stabilizer-free film.

When repeating the experiment, but adding to each solution 2% of a cross-linking agent, e.g.

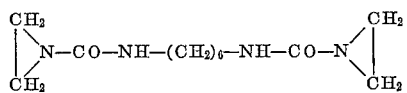

additionally to the stabilizing compounds as given in Table 3, preparing films, heating the films one additional hour to 130° C., the polyurethanes were cross-linked (insoluble in dimethylformamide) and proved to be stabilized against discolouration by UV-radiation and combustion-gas like the linear polyurethanes.

EXAMPLE 9

A polyurethane foam, which was prepared according to Ullmann "Enzyklopädie der technischen Chemie" 3rd edition, vol. 14, page 356, lines 3 to 11, was immersed for two minutes in a methanol solution of N'-(3,5-ditertiarybutyl - 4 - hydroxy-phenylpropyl)-N,N-dimethyl-semicarbazide (5% stabilizer in solution). After drying, the foam showed a content of stabilizer of 0.12%.

This foam showed no discolouration after 22 hours exposure to the UV-light of a Fade-o-meter. The unstabilized foam, however, showed under the same conditions a yellow discolouration and was affected in its mechanical properties.

What is claimed is:

1. A stabilized polyurethane having incorporated therein a stabilizing amount of a composition of the formula:

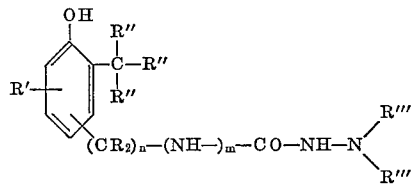

wherein:

R is hydrogen, an alkyl having from about 1 to about 12 carbon atoms, or a cycloalkyl containing 5 or 6 carbon atoms;

R' is hydrogen, an alkyl or cycloalkyl having up to about 12 carbon atoms, an alkoxy containing from 1 to 6 carbon atoms, chlorine, bromine or iodine;

R'' is an alkyl having from about 1 to about 18 carbon atoms or a cycloaliphatic having 5 or 6 carbon atoms;

R''' is an alkyl having from about 1 to about 12 carbon atoms, a cycloalkyl group having 5 to 12 carbon atoms, an w-hydroxyalkyl group having from 1 to 6 carbon atoms in the alkyl group, w-chloroethyl or two R''' groups form a 5 or 6-membered ring;

$n$ is an integer of from 1–12; and $m$ is 0 or 1.

2. The polyurethane of claim 1 wherein the phenol is present at a concentration of from about 0.05 to about 10% by weight of the polyurethane.

TABLE 3

| Weight of stabilizer added, percent | —X | Melting point of stabilizer |
|---|---|---|
| 0.8 | —N—(CH$_2$—CH$_2$—OH)$_2$ | Slowly crystallizing oil; $n_D^{20}$ 1.5287. |
| 1.5 | —N—(CH$_2$—CH—OH)$_2$<br>         CH$_3$ | 92–94°. |
| 3.0 | —N(CH$_2$—CH$_2$)$_2$O (morpholino) | 176°. |
| 2.0 | —N(CH$_2$—CH$_2$)$_2$SO$_2$ | 203–204°. |
| 2.0 | —N(CH$_2$—CH$_2$)$_2$N—NH—CO—NH—(CH$_2$)$_3$—[3,5-di-tert-butyl-4-hydroxyphenyl] | 262–264°. |

3. The polyurethane of claim 1 wherein the phenol has the formula:

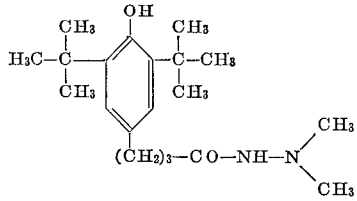

wherein $n$ is an integer of from 1 to 3.

4. The polyurethane of claim 1 wherein the phenol has the formula:

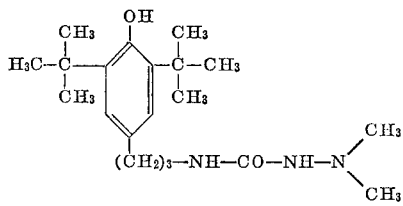

5. The polyurethane of claim 1 wherein the phenol has the formula:

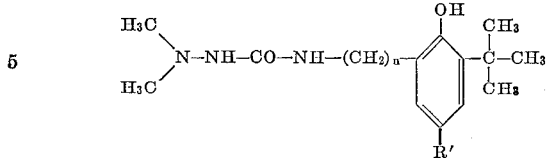

wherein R' is an alkyl group having 1 to 6 carbon atoms, chlorine or methoxy and $n$ is an integer of from 1 to 3.

6. The polyurethane of claim 1 wherein the phenol has the formula:

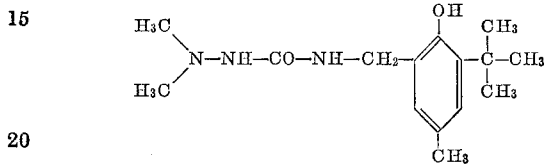

References Cited

UNITED STATES PATENTS

| 3,149,998 | 9/1964 | Thurmaier | 260—45.9 |
| 3,399,167 | 8/1968 | Rosendahl et al. | 260—45.9 |

FOREIGN PATENTS 1,184,948   1/1965   Germany.

HOSEA E. TAYLOR, JR., Primary Examiner

U.S. Cl. X.R.

260—2.5, 32.6, 37, 40, 45.7, 45.8, 45.85, 45.95, 75, 77.5

UNITED STATES PATENT OFFICE
CERTIFICATE OF CORRECTION

Patent No. 3,538,046                    Dated November 3, 1970

Inventor(s) Harald Oertel, et al.

It is certified that error appears in the above-identified patent and that said Letters Patent are hereby corrected as shown below:

| Column | Line | Error |
|---|---|---|
| 1 | 47 | "phenyl" should read --- phenol --- |
| 1 | 48 | "phenyl" should read --- phenol --- |
| 2 | 3 | "inention" should read --- invention --- |
| 2 | 45 formula | "OH" should read --- OH --- (with vertical bar) |
| 3 | 50 | "-dialykyl: should read --- -dialkyl --- |
| 3 | 69 | "hereto" should read --- hetero --- |
| 4 | 14 | "phenylpropyl" should read --- phenyl-propyl --- |
| 4 | 39 | "-ditertiary octyl-" should read --- -ditertiaryoctyl- --- |
| 4 | 49 | "phenylethyl)" should read --- hydroxybenzyl) --- |
| 5 | 12 | "copolyethes" should read --- copolyethers --- |
| 6 | 10 | "(etg." should read --- (e. g. --- |
| 9 | Note under Table 1 | "⟋" should read --- ⟍ --- |

Page 2

UNITED STATES PATENT OFFICE
CERTIFICATE OF CORRECTION

Patent No. 3,538,046      Dated November 3, 1970

Inventor(s) Harald Oertel, et al.

It is certified that error appears in the above-identified patent and that said Letters Patent are hereby corrected as shown below:

| Column | Line | Error |
|---|---|---|
| 10 | 68 | "solutin ois" should read --- solution is --- |
| 11 | 29 | Insert --- Table II --- |
| 15 | Claim 3 formula | " $(\overset{\mid}{C}H_2)_3-$ " should read --- $(\overset{\mid}{C}H_2)_n-$ --- |

SIGNED AND SEALED
MAR 2 1971

(SEAL)
Attest:

Edward M. Fletcher, Jr.
Attesting Officer

WILLIAM E. SCHUYLER,
Commissioner of Patents